United States Patent [19]
Lechner et al.

[11] 4,415,881
[45] Nov. 15, 1983

[54] DIGITAL-TO-ANALOG CONVERTER

[75] Inventors: Robert Lechner, Otterfing; Klaus Wintzer, Munich, both of Fed. Rep. of Germany

[73] Assignee: Siemens AG, Berlin and Munich, Fed. Rep. of Germany

[21] Appl. No.: 184,775

[22] Filed: Sep. 8, 1980

[30] Foreign Application Priority Data

Sep. 26, 1979 [DE] Fed. Rep. of Germany ....... 2938947

[51] Int. Cl.[3] ............................................ H03K 13/02
[52] U.S. Cl. ........................ 340/347 AD; 340/347 M; 370/6; 370/113
[58] Field of Search ...................... 340/347 M, 347 C; 370/6, 112–115

[56] References Cited

U.S. PATENT DOCUMENTS

| Re. 30,294 | 11/1977 | Hoeffer | 340/347 C |
|---|---|---|---|
| 3,735,392 | 5/1973 | Kaneko | 340/347 AD |
| 3,819,864 | 6/1974 | Carroll . | |
| 3,984,829 | 10/1976 | Zwack | 340/347 C |
| 4,017,687 | 4/1977 | Hartzler et al. | 370/6 |

FOREIGN PATENT DOCUMENTS

2708605 8/1978 Fed. Rep. of Germany .

OTHER PUBLICATIONS

The Engineering Staff of Analog Devices, Inc., Analog-Digital Conversion Handbook, 6/72, pp. I-2 to I-5; II-46 to II-48, III-78 to III-83.

Calkins et al., Data Acquisition in a Dip Shrinks Systems, Electronics, Jul. 8, 1976, pp. 77–83.
Millman et al., Pulse and Digital Circuits, McGraw-Hill Book Co., Inc., 1956, pp. 28–36.
Moschytz et al., "Transmission Matrix of Switched-Capacitor Ladder Networks: Application in Active-Filter Design" Art. from IEE Proc., vol. 127, Pt. G, Apr. 1980, pp. 87–98.
Herbst et al., "Mos Switched-Capacitor Filters", Art. from IEEE Int. Solid State Circuits Conf. vol. XXII No. (1979-02), pp. 74, 75 and 281.

*Primary Examiner*—T. J. Sloyan
*Attorney, Agent, or Firm*—Karl F. Milde, Jr.

[57] ABSTRACT

An analog-to-digital converter for converting analog signals received in parallel on a plurality of incoming lines into digital signals comprises a selector unit having a plurality of signal inputs. Each input is connected to an incoming line via a filter capacitor. A grounded network connected to an output of the selector unit has a storage capacitor and a switch arranged in parallel for short-circuiting the capacitor temporarily. The network simulates a common resistor for establishing a filter section together with the presently through-connected filter capacitor. One input of a comparator is connected to the selector output. The second input is supplied by an analog reference voltage source which may comprise a digital-to-analog converter for supplying an analog reference voltage adjustable under control of the current condition of the comparator output signal. The reference voltage thus is iteratively approximated to the current analog value of the stored sampling probe.

3 Claims, 1 Drawing Figure

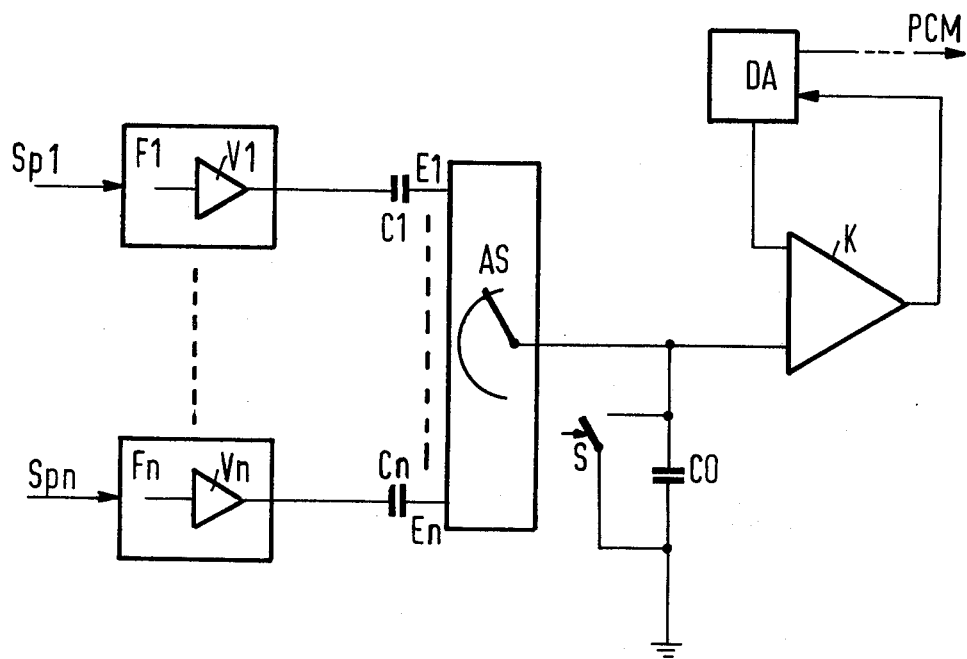

DIGITAL-TO-ANALOG CONVERTER

BACKGROUND OF THE INVENTION

The invention is directed to an analog-to-digital converter for consecutively converting analog signals received in parallel on a plurality of incoming lines into corresponding binary encoded digital output signals.

More specifically, the invention is related to a converter as above for use with a pulse coded time division multiplex telephone exchange system. In such a system the incoming lines comprise speech channels carrying analog voice signals generated by electro-acoustical or electro-optical converters. The continuous analog voice signals have to be sampled for band-pass filtering and encoding. From the analog voice signal a binary coded digital signal is derived which is transmitted across transmission lines to a corresponding receiving circuit arrangement where the original signal is reconstructed from the transmitted signal.

Filtering of a voice signal can be established in a conventional manner in using an integrated filter circuit limiting the band width of the voice signals to a predetermined frequency band identical with the band width of a voice channel. The filter circuit also comprises an output amplifier having an output coupled to an input of a selector unit controlling the sampling operation. This selector unit is associated with a whole group of such speech channels limited by the number of signal inputs. At an output of the selector unit a sampling probe of a voice signal is delivered for digital encoding.

For encoding the sampled signal a known converting method, the so-called iterative method can be employed. The output of the selector unit is connected to a grounded storage capacitor and in parallel to a first input of a comparator having a second input for receiving a current reference signal. This reference signal, in the given case, is generated in such a manner that at a starting time a digital figure is generated which is converted into its corresponding analog voltage. This internally generated analog voltage is supplied to the comparator as reference voltage thus being compared with the current sampling signal. In accordance with the condition of the comparator by means of its output signal, the previously generated digital number is adjusted to be higher or smaller and is converted into a new corresponding analog reference signal again applied to the comparator. This scheme of iteratively adjusting a presently established digital number step by step is continued until the approximation of this digital value to the stored analog value is sufficiently exact. The final digital number then represents the converted digital value of the sampling probe which is presently buffered in the storage capacitor.

Obviously, the voltage drop across the storage capacitor representing the analog value of a sampling probe may not change because of a leakage loss as long as the converting operation continues. Such a change also could be effected by the off-set failure of the mentioned output amplifier. For eliminating the influence of such an off-set failure in each input circuit for sampling and storing an analog value a rejector circuit has to be provided. Additionally, it is desirable that interfering voltages having a frequency below the speech channel band width, as for example noise induced by power mains, are attenuated.

If sampling probes of several output amplifiers each associated with a different speech channel are consecutively stored without a timely overlapping by one and the same storage capacitor cross-talk attenuation in such a system for digital transmission of voice can be reduced as much that the cross-talk level can interfere with the transmission of the useful signals. Furthermore, if integrated selector units are provided for the sampling operation, the switch-on resistance of such selector units has to be as high as to avoid overdriving the output stage of the output amplifier while setting up a through-connection. In such a situation, a time constant determined by the switch-on resistance and the necessary capacity of the storage capacitor can assume such a value that the storage capacitor cannot be discharged sufficiently between sampling intervals. The residual charge of the storage capacitor then results in a cross-talk effect.

It is, therefore, an object of the present invention to provide an improved analog-to-digital converter designed in such a manner that high cross-talk attenuation is obtained by minimal outlay of circuit design.

Another object of the present invention is to provide a converter as above of a design which is suitable for use with integrated circuit technology.

SUMMARY OF THE INVENTION

The above-noted objects, as well as other objects which will become apparent from the discussion that follows, are achieved according to the present invention by providing an analog-to-digital converter for consecutively converting analog signals received in parallel on a plurality of incoming lines into corresponding binary encoded digital output signals, which converter comprises a plurality of filter capacitors wherein each of the capacitors is connected to an incoming line. There is also arranged a selector unit having signal inputs each connected to a respective one of the capacitors and an output for delivering a presently through-connected sampling signal during a sampling interval. A grounded network is connected to the output of the selector unit and comprises a storage capacitor and a switch arranged in parallel to the storage capacitor for temporarily short-circuiting the capacitor after a sampling interval. A comparator is connected by a first input to the output of the selector unit. An analog reference voltage source is applied to the second input of the comparator.

According to the present invention at the output of each output amplifier interfacing each incoming line there is arranged a capacitor for eliminating a direct current component resulting from the off-set failure of the amplifier. Additionally, this capacitor forms an element of a filter section for attenuating frequencies below the speech channel band width. To form a filter section apparently a resistor has to be implemented. The sampling arrangement according to the present invention, however, is designed in such a manner that separate resistors for each speech channel have been avoided. Instead of that, there is arranged a common resistor element at the output of a selector unit. The grounded network comprises the storage capacitor and the switch designed as electronic switch and arranged in parallel to the capacitor and simulates a resistor element common to all filter sections. Such a simulating circuit in itself is known as an equivalent for an ohmic resistor. The value of the resistance is determined by the capacitance of the storage capacitor and the switching frequency of the switch. This switch which can be integrated into the complete analog-to-digital converter and short-circuits the capacitor prior to each subsequent sampling interval, also includes the storage capacitor which is thus discharged prior to each sampling interval whereby high cross-talk attenuation is achieved.

Furthermore, under the control of the selector unit a filter section thus composed of one of the capacitors arranged at a respective input of the selector unit and of the grounded network is not constantly through-connected but activated just during a sampling interval. From this follows that the filter capacitor can be differently dimensioned from a fixedly connected capacitor. Since each filter section is cut off during most of the sampling intervals determined by the operation of the selector unit and is only activated once during a sampling cycle of the selector unit, a long discharge time for the filter capacitor is achieved. Thus, a virtual time constant can be defined. It is determined by the following relationship: the ratio of the virtual time constant to an actual time constant of a filter section with a fixedly connected and constantly activated capacitor equals the ratio of a sampling cycle to a sampling interval. This virtual time constant is, in other words, n times higher than a time constant of a filter section having a fixedly connected and constantly activated capacitor of the same capacitance, wherein the factor n is defined by the number of speech channels sampled by the selector unit. In fact, the implemented filter capacitor can have just 1/n-th of the value of a fixedly connected capacitor and still the same filter parameters are obtained.

BRIEF DESCRIPTION OF THE DRAWING

A better understanding of the invention may be had by reference to the following description of a preferred embodiment in conjunction with the accompanying drawing, in which the single FIGURE shows a block diagram of an analog-to-digital converter for use with a PCM telecommunication system.

DESCRIPTION OF A PREFERRED EMBODIMENT

The preferred embodiment of the invention will now be described with reference to the drawing showing a circuit arrangement for a digital telephone exchange by which arrangement voice signals occurring on speech channels Sp1 through Spn supplied by electro-acoustical converters or electro-optical converters not shown are converted into digital signals for being transmitted along a transmission line PCM in form of pulse code modulated digital signals.

It is assumed that the shown arrangement is associated with at least two speech channels. This is advisable in order to fulfill a requirement of the sampling theorem demanding the sampling frequency to be at least twice as high as the highest frequency of the frequency spectrum of a sampled signal. Also for this reason in the individual speech channels Sp1 through Spn there are arranged individually filter circuits F1 through Fn which limit the occurring voice signals to a given band width.

At the internal outputs of these filter sections there are arranged integrated output amplifiers V1 through Vn. The outputs of these amplifiers are individually coupled to a respective one of signal inputs E1 through En of a selector unit AS via a respective one of filter capacitors C1 through Cn. The operating rate of the selector unit AS determines in consideration of a given sampling frequency a sampling cycle. In a sampling cycle consecutively all the outputs of the filter sections F1 through Fn are monitored for the current analog value of the output signal. A voltage value thus obtained during a sampling interval may be called a sampling probe. The sampling probe is supplied via one of the filter capacitors C1 through Cn and the selector unit AS to a storage capacitor C0 which is arranged between an output of the selector unit AS and ground. Also a comparator K is attached by a first input to the connector tap between the storage capacitor C0 and the output of the selector unit AS.

The filter capacitors C1 through Cn serve to eliminate a direct current component resulting from an offset failure of integrated output amplifiers V1 through Vn and form, in addition, an element of a high-pass filter section. Interfering voltages induced onto a speech channel and having a frequency below the band width of the speech channel shall be attenuated by this high-pass filter section. A complete filter section has to be provided with a resistor. Resistors have not been implemented separately for each filter section. A resistor element is simulated in common for all filter sections by the storage capacitor C0 and an electronic switch which is arranged in parallel to the storage capacitor for short-circuiting this capacitor in accordance with a given keying frequency of the switch S. The value of the simulated resistor is determined by the value of the storage capacitor C0 and this switching frequency of the electronic switch S.

Since each high-pass filter section is not fixedly connected to the input circuit of the evaluating comparator but is just effective for a time span which is determined by the sampling interval, the values for the filter capacitors C1 through Cn can be chosen smaller than for a corresponding discrete and fixedly connected filter capacitor. Since it has to be considered that each filter section is activated just for a sampling interval, it is cut off during all the following sampling intervals determined by the operation of the selector unit and is only activated again when the selector unit has completed an entire sampling cycle. Thus, a virtual time constant can be determined which is the effective time constant in respect of the filter characteristic. The virtual time constant is n times the time constant of a filter section having a fixedly connected and constantly activated capacitor, assuming the same capacitance. In fact, the implemented filter capacitor has a small value which is 1/n-th of the value of a fixedly connected capacitor whereby factor n corresponds to the number n of speech channels. This small capacitance value offers the opportunity, instead of using discrete capacitors in implementing the filter section, to integrate the filter capacitors into the circuit arrangement.

The capacitor C0 of the grounded network simulating a common resistor of the filter sections also serves as a storage capacitor for the sampling probes obtained during sampling intervals. This storage capacitor C0 is short-circuited by the electronic switch S and thereby discharged prior to any operation during a sampling interval. The switch S also is implemented as an integrated electronic switch. Its cross-resistance can be designed such that its value is much less than a corresponding value for the switch resistance of the selector unit AS. Thus, the storage capacitor is discharged rapidly when switch S is closed. Thereby it is eliminated that still a residual charge is withheld at the beginning of a following sampling interval. Such a residual charge could have an undesirable effect in view of reducing cross-talk attenuation because of the given ratio of the storage capacitor to the filter capacitor of an active high-pass filter section. Such an undesired effect is definitely avoided by the rapid discharge of storage capacitor C0, as described.

As has been mentioned, a sampling probe representing the present analog value of a signal at the output of the through-connected speech channel besides being stored in the storage capacitor C0 also is applied to one input of comparator K. The second input of this comparator receives an analog signal which is, according to the present embodiment, established by a digital-to-analog converter DA. This converter is part of a device for converting analog signals into digital signals employing conventional iterative approximation, as has been described in detail in the "Background Of The Invention". The digital-to-analog converter DA represented in the drawing re-converts the digital number into an analog information. This can be achieved in use of a so-called R-2R-network which is well known in the art for converting a digital information into a corresponding analog signal, thus detailed description of the digital-to-analog converter is not deemed to be necessary.

In the course of each sampling interval several comparison cycles for approximating the presently given analog value of a sampling probe to a corresponding digital number have to be performed. Finally, a sufficiently close approximation of the stored analog sampling probe applied to one input of the comparator K and the corresponding analog value received at the second input is obtained. The corresponding digital number then represents the digital value of the analog sampling probe. This information may then be delivered in form of a PCM signal to a register, not shown, which controls transmission operations along a transmission line PCM.

Having completed the encoding operation, the stored sampling probe is no longer useful. Storage capacitor C0 then being short-circuited via the electronic switch S is discharged prior to storing the sampling probe of the speech channel selected subsequently. The comparison operations described will then be performed again for encoding the new sampling probe into a digital output signal.

There has thus been shown and described a novel arrangement for an analog-to-digital converter for consecutively converting analog signals received in parallel on a plurality of incoming lines into corresponding binary encoded digital output signals which fulfills all the objects and advantages sought therefor. Many changes, modifications, variations and other uses and applications of the subject invention will, however, become apparent to those skilled in the art after considering the specification and the accompanying drawing, which disclose a preferred embodiment thereof. All such changes, modifications, variations and other uses and applications which do not depart from the spirit and scope of the invention are deemed to be covered by the invention which is limited only be the claims which follow.

What is claimed is:

1. In an analog-to-digital converter for consecutively converting analog signals received in parallel on a plurality of incoming lines into corresponding binary encoded digital output signals, the improvement comprising:
   (a) a plurality of filter circuits for band pass filtering of incoming analog signals, each having an input connected to a respective incoming line, and an output and including a filter capacitor connected to said output;
   (b) a selector unit having a plurality of signal inputs, each input being connected to a respective one of said filter capacitors, and an output for delivering a sampling signal received from a presently through-connected incoming line during a respective sampling interval;
   (c) a grounded network connected to said output of said selector unit and comprising a storage capacitor and a switch arranged in parallel to said storage capacitor for temporarily short-circuiting said capacitor after each sampling interval; and
   (d) a comparator having a first and a second input and an output, said first input being connected to said output of said selector unit and said second input being supplied by an analog reference voltage source;
   wherein said grounded network is designed such that it is capable of both storing a sampling signal during the corresponding sampling interval, and simulating a common resistance consecutively associated with a respective one of the filter capacitors to form an individually dedicated resistor-capacitor filter circuit during each of the sampling intervals.

2. The analog-to-digital converter as recited in claim 1, wherein said reference voltage source further comprises a digital-to-analog converter having an input connected to said output of said comparator, having a first output for delivering a pulse code modulated output signal and having a second output connected to said second input of said comparator for supplying an analog reference voltage corresponding to the current output of said comparator which is iteratively approximated to the current analog value of the analog sampling signal.

3. The analog-to-digital converter as recited in claim 1, for use with a pulse code time division multiplex telephone exchange system for filtering and encoding speech signals corresponding to said analog signals into pulse code modulated signals.

* * * * *